(12) United States Patent
Pellerin et al.

(10) Patent No.: US 7,069,644 B2
(45) Date of Patent: Jul. 4, 2006

(54) ADJUSTABLE WORKPIECE SUPPORT ASSEMBLY FOR CONVEYORS

(75) Inventors: Dan Pellerin, Howell, MI (US); Boris R. Teper, Farmington Hills, MI (US); Brian Hoy, Brighton, MI (US)

(73) Assignee: Dürr Systems, Inc., Plymouth, MI (US)

( * ) Notice: Subject to any disclaimer, the term of this patent is extended or adjusted under 35 U.S.C. 154(b) by 245 days.

(21) Appl. No.: 10/723,098

(22) Filed: Nov. 26, 2003

(65) Prior Publication Data

US 2004/0173323 A1 Sep. 9, 2004

Related U.S. Application Data

(60) Provisional application No. 60/453,001, filed on Mar. 7, 2003.

(51) Int. Cl.
*B23P 19/00* (2006.01)
(52) U.S. Cl. ................. 29/802; 29/894.31; 269/74
(58) Field of Classification Search ............... 29/802, 29/894.31, 559; 269/45, 71, 74, 308
See application file for complete search history.

(56) References Cited

U.S. PATENT DOCUMENTS

| | | | |
|---|---|---|---|
| 2,661,053 A | 12/1953 | Mullen | 157/1.1 |
| 2,665,747 A | 1/1954 | Harrison | 157/1.1 |
| 2,778,388 A * | 1/1957 | Harrison | 141/101 |
| 3,306,601 A * | 2/1967 | Mitchell | 269/50 |
| 3,489,198 A | 1/1970 | Malinski | 157/1.17 |
| 3,495,296 A * | 2/1970 | Kilgore et al. | 425/29 |
| 3,522,832 A * | 8/1970 | Held et al. | 157/1.22 |
| 4,163,468 A | 8/1979 | Mueller | 157/1.17 |
| 4,563,975 A | 1/1986 | Kozlowski et al. | 118/320 |
| 4,800,944 A | 1/1989 | Kane | 157/1.22 |
| 5,170,828 A | 12/1992 | Curcuri | 157/1 |
| 5,228,667 A * | 7/1993 | Bridegum | 269/45 |
| 6,125,904 A | 10/2000 | Kane et al. | 157/1.24 |
| 6,820,868 B1 * | 11/2004 | Reymus | 269/41 |

* cited by examiner

*Primary Examiner*—George Nguyen
*Assistant Examiner*—Christopher M. Koehler
(74) *Attorney, Agent, or Firm*—Howard & Howard

(57) ABSTRACT

An assembly for mating a tire with a wheel includes a conveyance device, which supports a device, i.e. first plate for supporting the wheel having spaced seats extending around a vertical axis. A tire support, i.e. second plate supports the tire having spaced beads on the wheel with one bead looped between the seats and outside the seats. A tool of the present invention forms the seats over the bead with the entire bead disposed between said seats. A tread support, i.e. a pair of walls spaced one from the other, are connected to the second plate for engaging the tread of the tire. The tire support includes connectors for adjusting the pair of walls horizontally to and away from the vertical axis. A side support, i.e. arms; are adjustably supported on the respective walls for engaging the side of the tire.

35 Claims, 3 Drawing Sheets

ADJUSTABLE WORKPIECE SUPPORT ASSEMBLY FOR CONVEYORS

RELATED APPLICATION

The subject patent application claims priority to all the benefits of U.S. Provisional Patent Application Ser. No. 60/453,001, filed on Mar. 7, 2003.

FIELD OF THE INVENTION

The subject invention relates to a workpiece support assembly for conveyors, and more particularly to the assembly that includes seats or stuffers for positioning a tire against a respective wheel when assembling the same.

BACKGROUND OF THE INVENTION

With the advent of flexible manufacturing, it has become desirable to process an ever-increasing variety of wheels and tires, through a single assembly line. Numerous assembly lines for mounting tires are known in the prior art and are used today in the automotive industry to provide maximum production efficiency. Typically, the automated assembly line for mounted units includes a central conveyor base to accommodate various work-stations for production of the wheels.

Generally, the automotive assembly line for mounted units, such as, for example tires and wheels, includes a pair of roller conveyors, whereby each roller conveyor is designed for supporting and transferring the tires and wheels, respectively, when the tires and wheels are received from tire and wheel supplying sources, i.e. stations at the assembly plant. These stations include a tire loader station designed to position the tire on a tire supporting plate operably connected to one of the conveyors. Typically, a wheel loader station, designed to position the wheel on a wheel plate, is operably connected to another conveyor. A wheel soaper station for applying a lubricant solution onto the edges of the wheel is adjacent to the wheel loader station.

Another station of the automated assembly line, such as a tire soaper station is also provided at the assembly line for applying the lubricant around the inner circumference of the tire before mounting the tire about the wheel to form the wheel. The assembly line includes a wheel and tire mounting station for mounting lubricated tires onto the respective wheels and a tire inflation assembly for inflating the tire mounted on the wheel. Generally, the wheel is transferred by the first conveyor to the tire mounting station. At the same time, the tire is transferred by the second conveyer, positioned above the first conveyor, to the wheel mounting station. The soaping, i.e. lubricating of the tires and wheels occurs before the tire is mated with the respective wheel at a central conveyor.

The art is replete with various designs of tire mounters that include tire bed or seat for resting the tire against during mounting the tire onto the respective wheel. The U.S. Pat. No. 2,665,747 to Harrison, U.S. Pat. No. 3,489,198 to Malinski, U.S. Pat. No. 4,163,468 to Mueller, U.S. Pat. No. 4,800,944 to Kane, U.S. Pat. No. 5,170,828 to Curcuri, and U.S. Pat. No. 6,125,904 to Kane et al. disclose a variety of stuffers and seats structured to rest the tire against the seat or stuffer during mounting of the tire onto the respective wheel to slide the tire against its respective wheel to form a wheel.

The U.S. Pat. No. 5,170,828 to Curcuri teaches an apparatus for integrated tire mounting and inflating performed at a single station that includes a pair of mutually spaced apart stuffers that seat the tire to the wheel. Each stuffer includes a shoe which is pivotally connected with a transfer pallet. Each shoe is further structured to bias against a tread of a tire to cause the tire to abut a wheel to the tires lower end. The apparatus also includes a fluidic actuator having a cylinder, pivotally connected with a transfer pallet. The actuator includes a piston rod connected with the shoe to move the shoe upwardly and downwardly while mounting the tire on the wheel.

The U.S. Pat. No. 4,800,944 to Kane teaches a pallet conveyor of a conventional design to carry a plurality of spaced pallets, which in turn carry a vehicle wheel. A tubeless tire is rested in the inclined position upon the wheel. The forward portion of the tire rests upon a seat mounted on the conveyor. The seat causes the tire to abut against the wheel at the tires low end.

The U.S. Pat. No. 6,125,904 to Kane et al. teaches an apparatus for mounting a tire on a wheel. The apparatus includes a robot having at least one articulated joint and a wrist, a pallet conveyor system, a tire mounting station that includes a tire engaging clamp and a seat. The tire is rested in a predetermined inclined position on the wheel. The edge of the wheel rests against the seat and the tire is held in a non-rotatable position by the clamp.

Although the prior art tire seats and stuffers for tires are widely used in the automotive industry, one of the areas of continuous development and research is the area of a more advanced design of a stuffer or tire positioner for sliding, positioning, and mounting the tire against a wheel, particularly where an assembly line is intended to process a high number of tire sizes.

BRIEF SUMMARY OF INVENTION

A contemporary automotive assembly line for mounting tires with respective wheels includes a pair of conveyors designed for supporting and transferring the tires and wheels, respectively, which are received from tire and wheel supplying sources, i.e. stations at the assembly plant. The wheels and tires are transferred by the first and second conveyors to an assembly for mating the tire with the wheel. The assembly includes a device for supporting the wheel having spaced seats extending around a vertical axis. A tire support for supporting the tire having spaced beads on the wheel with one bead looped between the seats and outside the seats is adjacent the device for supporting the wheel. The assembly includes a tool for forming the seats over the bead with the entire bead disposed between the seats. A tire support of the present invention includes a tread support for engaging the tread of the tire. A side support for engaging the side of the tire is connected to the tread support. The tire support is adjustably supported on the tread support.

An advantage of the present invention is to provide a tire positioner, where, unlike typical seats and stuffers for tires, the tire positioner of the present invention does not employ the use of springs, or actuators of any kind to adjust the mounting of the tire on the wheel.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

A contemporary automotive assembly line for mounting tires T with respective wheels R includes a pair of conveyors (not shown) designed for supporting and transferring the tires T and wheels R, respectively, which are received from tire and wheel supplying sources, i.e. stations at the assembly plant (not shown). The wheel R is transferred by the first conveyor to an assembly for mating the tire T with the wheel R, generally shown at 10 in FIGS. 1 through 3, wherein like numerals indicate like or corresponding parts throughout the several views. At the same time the tire T is transferred by the second conveyor, positioned above the first conveyor to the assembly 10. The soaping, i.e. lubricating of the tires T and wheels R occurs before the tire T is mated with the respective wheel R.

Figure 1:
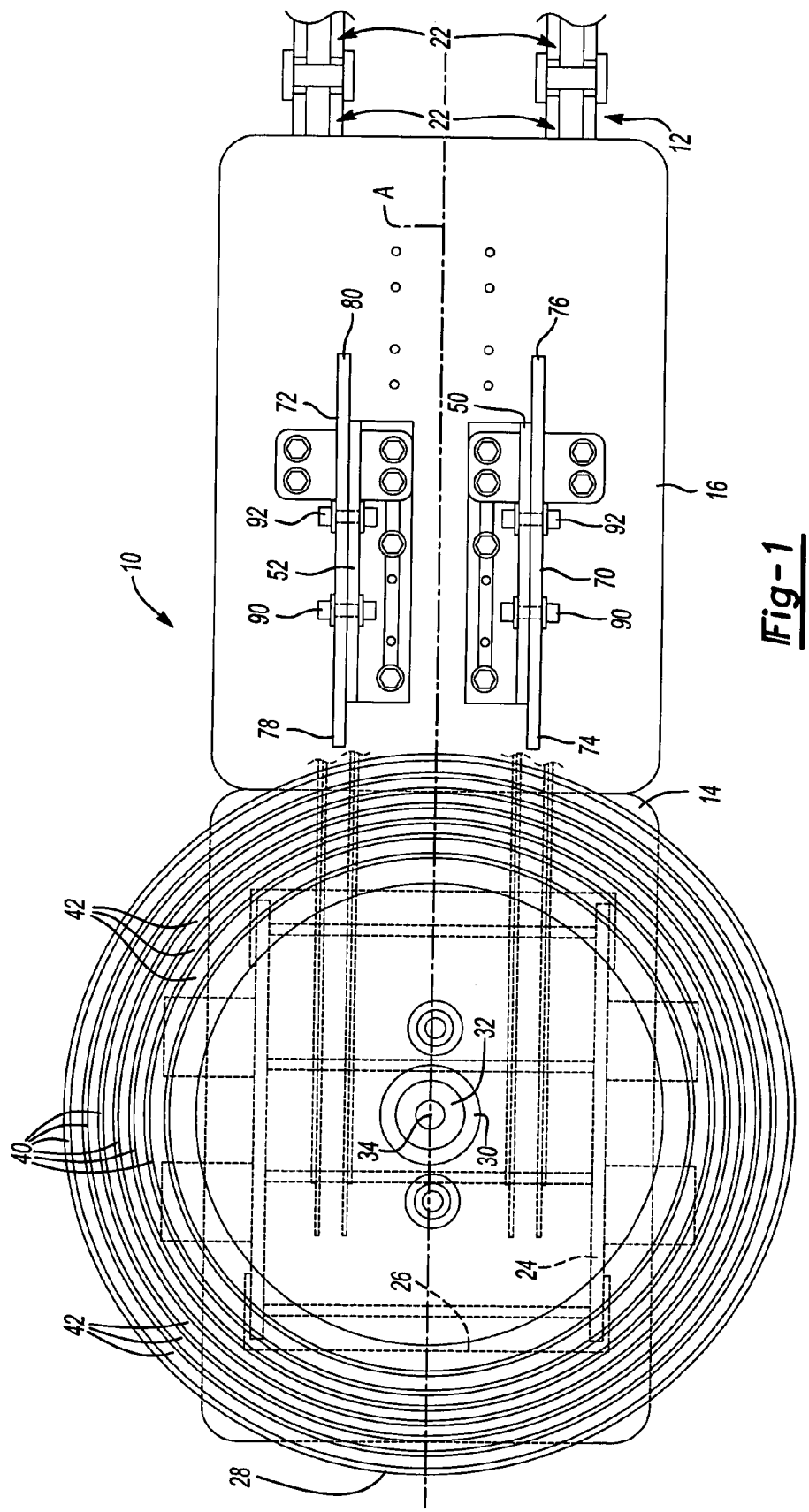
FIG. 1 is an elevational view of a first plate for supporting a wheel adjacent and operably connected to a second plate for positioning a tire.

Referring to FIG. 1, the assembly 10 of the present invention includes a conveyance device 12 that supports the tire T and the wheel R and presents a longitudinal axis A. A device, i.e. first plate 14 for supporting the wheel R having spaced seats extending around a vertical axis B. A tire support, i.e. second plate 16 for supporting the tire T having spaced beads on the wheel with one bead looped between the seats and outside the seats is adjacent to the first plate 14. The first 14 and second 16 plates are connected to the conveyance device 12. The invention includes a tool (not shown) for forming the seats over said bead with the entire bead disposed between the seats. A tread support 18 of the second plate 16 engages the tread of the tire T. A side support 20 of the second plate 16 engages the side of the tire T. The side support 20 is adjustable supported on the tread support 18.

The conveyance device 12 of the present invention includes a plurality of links, generally indicated at 22 and interconnected one with the other. While link, i.e chain and belt type of conveyance devices may be employed, both being well known to those skilled in the art, only the chain type conveyance device configuration has been described. Hence, the chain type conveyor configuration used in the assembly 10 is not intended to limit the present invention.

Figure 2:
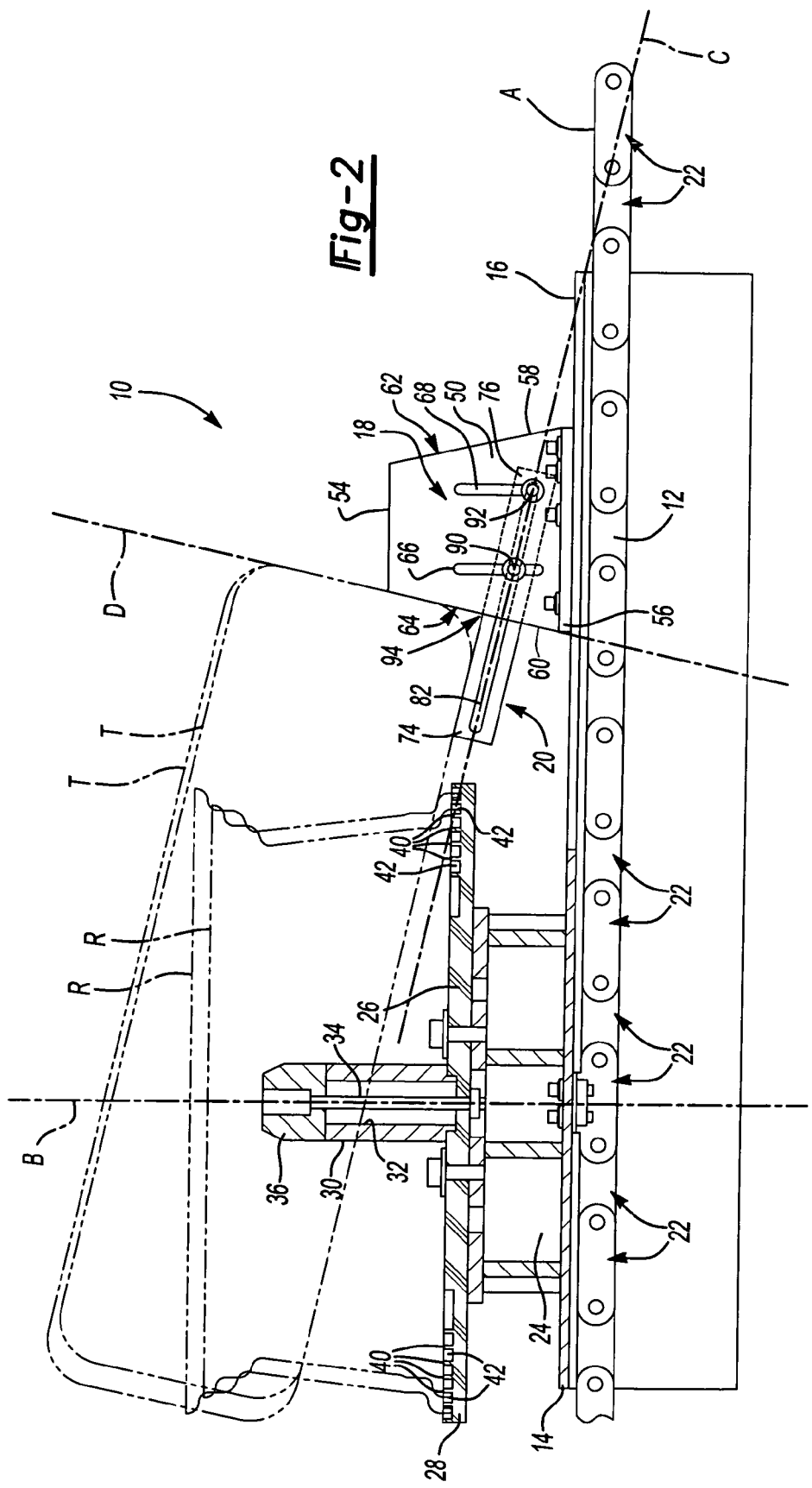
FIG. 2 is a cross sectional view of FIG. 1 having the wheel and the tire shown in phantom; and positioned one with respect to the other on the first and second plates, respectively.
Figure 3:
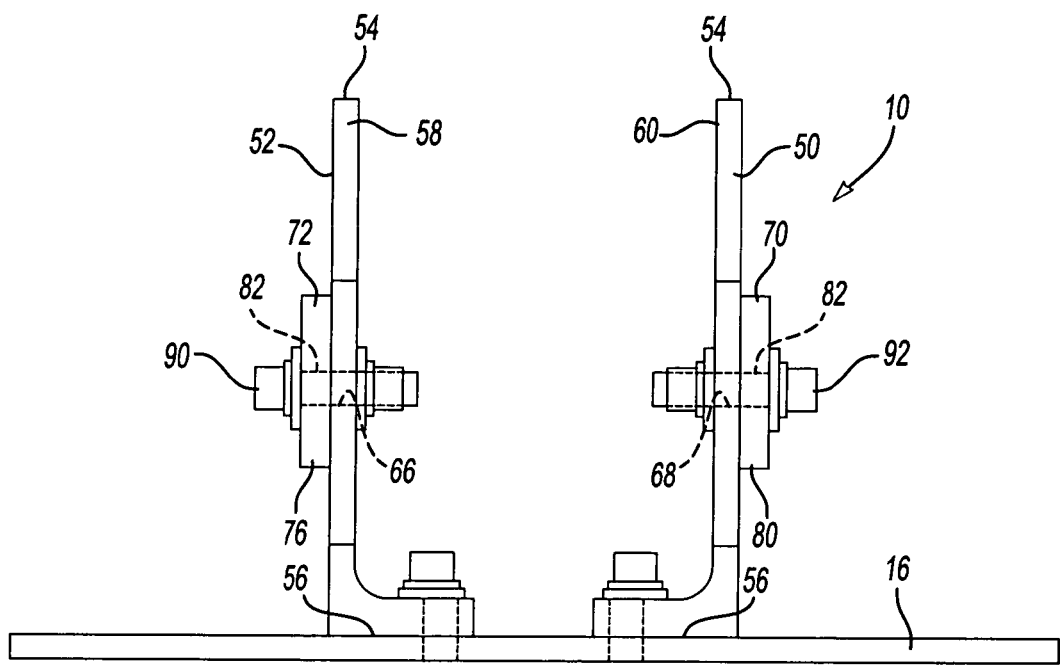
FIG. 3 is a side view of the second plate having walls of a first supporting element spaced one from the other and extending upwardly from the second plate and arms of a second supporting element connected to the walls, respectively.

Referring to FIGS. 1 and 2, the first plate 14 is connected to the conveyance device 12. A mount 24 for engaging a circular plate 26 defining a peripheral edge 28 is connected to the first plate 14. The circular plate 26 is operably connected to the mount 24 that is further secured to the first plate 14. A post 30 extends outwardly from the center of the circular plate 26. The post 30 includes an inlet portion 32 defined within the post 30 to receive a pin 34 that interconnects the post 30 with the first plate 14 and the circular plate 26. The post 30 includes a tip 36 at one of the respective ends to house the pin 34, as shown in FIG. 2. The circular plate 26 includes at least one locator 40 concentrically positioned between the peripheral edge 28 and the post 30. The locators 40 are integral with the circular plate 26 and extend outwardly therefrom, defining a groove 42 therebetween to seal and secure the wheel R upon the circular plate 26.

As best shown in FIG. 2, the second plate 16 is connected to the conveyance device 12 and is spaced from the first plate 14. The tread support 18 extends upwardly from the second plate 16. The tread support 18 is defined by a pair of plates 50, 52 spaced one from the other and extending upwardly from the second plate 16. Each plate 50, 52 includes an upper end 54, a lower end 56, and side wall 58, 60, extending at an acute angle from the lower end 56 to upper end 54. The side walls 58, 60 define an inclined surfaces, generally indicated at 62, 64 of the plates 50, 52, respectively, whereby the inclined surface 62 presents a tread supporting axis D. Each plate 50, 52 further include female connectors defined by first 66 and second 68 slots. The first 66 and second 68 slots extend between the lower 56 and upper 54 ends in a generally vertical direction. The plates 50, 52 are mechanically adjusted to the second platform 16. With respect to different operational modes of the present invention, the plates 50, 52 are movable to and away from the vertical axis B along the longitudinal axis A to accommodate mating of tires T and wheels R of various configurations.

The side support 20 of the present invention is defined by a pair of arms 70, 72. Each arm 70, 72 includes terminal ends 74, 76, 78, 80, and a female connector, respectively. The female connector of the arms 70, 72 is further defined by an elongated slot 82 extending between the terminal ends 74, 76, 78, 80, respectively, whereby only one elongated slot 82 is shown in FIG. 2. The arms 70, 72 are fixed with the respective plates 50, 52 by a pair of fasteners 90, 92. The fasteners 90, 92 extend through the elongated slot 82 of each arm 70, 72 and through the first 66 and second 68 slots of the respective plates 50, 52 to secure each arm 70, 72 to each plates 50, 52, respectively. The arms 70, 72 are fixedly attached to the plates 50, 52 to define a predetermined seat, generally indicated at 94 in FIG. 2, having an angle that mimics the angle defined between the annular side and the bottom surface of the tire T. While either slots 66, 68, and 82 defined in the plates 50, 52 and the arms 70, 72, respectively, or a plurality of holes (not shown) spaced one from the other and defined within the plates 50, 52 and the arms 70, 72 configurations may be employed, only the plates 50, 52 and the arms 70, 72 having elongated slots 66, 68, and 82 configurations have been described above and are not intended to limit the present invention.

The arms 70, 72 may move vertically and horizontally along the plates 50, 52. With respect to different operational modes of the present invention, the arms 70, 72 are movable upwardly from and downwardly to the second plate 16 to present the seat 94 of various angles defined between the inclined surface of the plates 50, 52 and the terminal ends 74, 78 of the arms 70, 72. This allows for the positioning of the tire T upon the respective wheel R prior to mounting the tire T and wheel R together at the assembly line. In addition, the first terminal ends 74, 78 of the arms 70, 72 are movable upwardly and downwardly with respect to the vertical axis B. Desirable alignment of the tire T to the respective wheel R is provided by an angle of the seat 94 defined between the first ends 74, 78 of the arms 70, 72 and the inclined surfaces 62, 64 of each plate 50, 52 of the tread support 18. As appreciated by those skilled in the art, a plurality of wheels R having different diameters may be positioned within and on the circular plate 24. To provide a desirable alignment between the tire T and the wheel R, the arms 70, 72 are pre-positioned relative to the slots 66, 68 to provide a seat 94 capable of aligning various sized tires T and wheels R in a desirable relationship.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for orienting a tire on a wheel in a position compatible with a tool capable of mating the tire with the wheel, comprising:
    a device for supporting a wheel having spaced seats extending around a vertical axis;
    a tire support for supporting a tire having spaced beads on the wheel with one bead looped between the seats and outside the seats;
    said tire support including a tread support for engaging the tread of the tire and a side support for engaging the side of the tire; and
    said tire support of said assembly characterized by said side support being adjustably supported on said tread support.

2. An assembly for mating a tire with a wheel as set forth in claim 1, wherein said tread support includes connectors for adjusting said tread support horizontally to and away from said vertical axis on said tire support.

3. An assembly for mating a tire with a wheel as set forth in claim 2, wherein said tread support is defined by a pair of walls.

4. An assembly for mating a tire with a wheel as set forth in claim 3, wherein said wall presents top and bottom ends interconnected by inclined sides.

5. An assembly for mating a tire with a wheel as set forth in claim 4, wherein said wall includes a first female connector.

6. An assembly for mating a tire with a wheel as set forth in claim 5, wherein said first female connector is further defined by a pair of slots.

7. An assembly for mating a tire with a wheel as set forth in claim 6, wherein said slots are spaced one from the other and defined between said top and bottom ends of said wall.

8. An assembly for mating a tire with a wheel as set forth in claim 7, wherein side support is defined by a pair of arms having terminal ends, respectively.

9. An assembly for mating a tire with a wheel as set forth in claim 8, wherein said arm includes a second female connector defined between said terminal ends of said arm.

10. An assembly for mating a tire with a wheel as set forth in claim 9, wherein said second female connector is defined by an elongated opening.

11. An assembly for mating a tire with a wheel as set forth in claim 10, wherein said first female connector of said arm is positioned perpendicularly and adjustably with respect to said second female connector of said wall.

12. An assembly for mating a tire with a wheel as set forth in claim 11, including a male connector extending between said female connectors of said wall and said arm to interconnect said arm with said wall.

13. An assembly for mating a tire with a wheel as set forth in claim 12, wherein said male connectors is defined by a pair of bolts.

14. An assembly for mating a tire with a wheel comprising:
    a conveyance device for supporting the tire and the wheel thereon and presenting a longitudinal axis;
    a first surface connected to said conveyance device for supporting the wheel of a predetermined configuration and presenting a vertical axis for engaging the wheel around said vertical axis;
    a second surface connected to said conveyance device for supporting a tire having a configuration complementary to the predetermined configuration of the wheel;
    first and second supporting elements for supporting and positioning the tire with respect to the wheel; and
    said second supporting element adjustably secured with said first element presenting a supporting axis diverging with respect to said longitudinal and said vertical axis to present a seat having a predetermined configuration complementary to the configuration of the tire for positioning thereby tire with respect to the wheel.

15. An assembly for mating a tire with a wheel as set forth in claim 14, wherein said first supporting element includes connectors for adjusting said first supporting element horizontally to and away from said vertical axis on said second surface.

16. An assembly for mating a tire with a wheel as set forth in claim 15, wherein said first supporting element is defined by a pair of walls.

17. An assembly for mating a tire with a wheel as set forth in claim 16, wherein said wall presents top and bottom ends interconnected by inclined sides.

18. An assembly for mating a tire with a wheel as set forth in claim 17, wherein said wall includes a first female connector.

19. An assembly for mating a tire with a wheel as set forth in claim 18, wherein said first female connector is further defined by a pair of slots.

20. An assembly for mating a tire with a wheel as set forth in claim 19, wherein said slots are spaced one from the other and defined between said top and bottom ends of said wall.

21. An assembly for mating a tire with a wheel as set forth in claim 20, wherein second supporting element is defined by a pair of arms having terminal ends, respectively.

22. An assembly for mating a tire with a wheel as set forth in claim 21, wherein said arm includes a second female connector defined between said terminal ends of said arm.

23. An assembly for mating a tire with a wheel as set forth in claim 22, wherein said second female connector is defined by an elongated opening.

24. An assembly for mating a tire with a wheel as set forth in claim 23, wherein said first female connector of said arm is positioned perpendicularly and adjustably with respect to said second female connector of said wall.

25. An assembly for mating a tire with a wheel as set forth in claim 24, including a male connector extending between said female connectors of said wall and said arm to interconnect said arm with said wall.

26. An assembly for mating a tire with a wheel as set forth in claim 25, wherein said male connectors is defined by a pair of fasteners.

27. An assembly for supporting a tire upon a wheel in a position suitable for mating the tire to the wheel, comprising:
    a first supporting element defining first and second slots; and a second supporting element defining a third slot interconnected with each of said first and second slots by male fasteners thereby providing varying degrees of orientation between said first and second supporting elements for providing a seat having a desirable orientation for supporting the tire against the wheel.

28. An assembly for supporting a tire upon a wheel in a position suitable for mating the tire to the wheel, as set forth in claim 27, wherein said first slot is further defined by said first supporting element including an elongated slot of a generally vertical orientation defined in said first supporting element.

29. An assembly for supporting a tire upon a wheel in a position suitable for mating the tire to the wheel, as set forth in claim 28, wherein said second slot is further defined by said first supporting element including another elongated slot of a generally vertical orientation defined in said first supporting element and spaced from said first elongated slot.

30. An assembly for mating a tire with a wheel as set forth in claim 29, wherein said third slot is further defined by said second supporting element including an elongated slot defined therein and oriented tranversely with respect to said first and second elongated slots.

31. An assembly for mating a tire with a wheel as set forth in claim 30, wherein said second supporting element being movable horizontally about said fasteners and with respect to said vertical axis.

32. An assembly for mating a tire with a wheel as set forth in claim 31, wherein said second supporting element being pivotably movable with respect to said longitudinal axis thereby diverging to and from said longitudinal axis.

33. An assembly for mating a tire with a wheel as set forth in claim 32, wherein said second supporting element being movable in a vertical direction about said first and second elongated slots presenting a surface planar with said longitudinal axis.

34. An assembly for mating a tire with a wheel as set forth in claim 33, wherein said second supporting element is defined by a pair of arms adjustable secures with the respective walls.

35. An assembly for mating a tire with a wheel as set forth in claim 34, wherein said first supporting element is defined by a pair of wall spaced from one the other.

* * * * *

UNITED STATES PATENT AND TRADEMARK OFFICE
CERTIFICATE OF CORRECTION

| | | |
|---|---|---|
| PATENT NO. | : 7,069,644 B2 | Page 1 of 1 |
| APPLICATION NO. | : 10/723098 | |
| DATED | : July 4, 2006 | |
| INVENTOR(S) | : Dan Pellerin, Boris R. Teper and Brian Hoy | |

It is certified that error appears in the above-identified patent and that said Letters Patent is hereby corrected as shown below:

In column 6, line 2, please delete "connectors" and insert -- connector --.

In column 6, line 22, please delete "thereby" and insert -- the --.

In column 6, line 61, please delete "connectors" and insert -- connector --.

In column 8, line 17, please delete "adjustable secure" and insert -- adjustably secured --.

In column 8, line 21, please delete "wall" and insert -- walls --.

Signed and Sealed this

Tenth Day of July, 2007

JON W. DUDAS
*Director of the United States Patent and Trademark Office*